US006669815B1

(12) United States Patent
Sugiyama et al.

(10) Patent No.: US 6,669,815 B1
(45) Date of Patent: Dec. 30, 2003

(54) SHEET SURFACE TREATING AGENT AND INK-JET PRINTING PAPER

(75) Inventors: Toshiaki Sugiyama, Tokyo (JP); Motosuke Ono, Tokyo (JP); Osamu Kamada, Tokyo (JP)

(73) Assignee: Hymo Corporation (JP)

( * ) Notice: Subject to any disclaimer, the term of this patent is extended or adjusted under 35 U.S.C. 154(b) by 0 days.

(21) Appl. No.: 09/508,573

(22) PCT Filed: Sep. 10, 1998

(86) PCT No.: PCT/JP98/04090

§ 371 (c)(1),
(2), (4) Date: Mar. 13, 2000

(87) PCT Pub. No.: WO99/13159

PCT Pub. Date: Mar. 18, 1999

(30) Foreign Application Priority Data

Sep. 11, 1997 (JP) ........................................... 9-262940

(51) Int. Cl.[7] ............................................. C08F 261/04

(52) U.S. Cl. ............................... 162/164.1; 162/164.6; 162/168.1; 162/169; 525/56; 525/59; 525/279; 525/293; 525/313; 525/330.3

(58) Field of Search ................................ 525/279, 293, 525/296, 298, 313, 330.3, 56, 59; 162/164.1, 164.6, 168.1, 169

(56) References Cited

U.S. PATENT DOCUMENTS 4,801,497 A 1/1989 Kono et al.
6,060,566 A * 5/2000 Denzinger et al.

FOREIGN PATENT DOCUMENTS

| | | | |
|---|---|---|---|
| EP | 0661168 | | 7/1995 |
| GB | 2213078 | | 8/1989 |
| JP | 60-110996 | | 6/1985 |
| JP | 61-235182 | | 10/1986 |
| JP | 2-2999 | | 1/1990 |
| JP | 5-67432 | | 9/1993 |
| JP | 8-134112 | * | 5/1996 |

OTHER PUBLICATIONS

Nakamae et al. , CAPLUS AN 1996:51321 (1996).*

* cited by examiner

*Primary Examiner*—Jeffrey Mullis
(74) *Attorney, Agent, or Firm*—Ostrolenk, Faber, Gerb & Soffen, LLP

(57) ABSTRACT

There is provided a treating agent for a sheet surface comprising a graft copolymer composed of a back bone polymer and branch polymer, either of which is a polymer having vinyl alcohol units, and the other of which is a polymer having cationic groups, the treating agent is applied onto a pulp sheet or plastic sheet, and the coated sheet is used in ink jet printing. Cationic groups are introduced by graft copolymerization using di(meth)allylamine-based and/or (meth)acryl-based monomer. Alternatively, the graft copolymer of the present invention is obtained by grafting N-vinylcarboxylic acid amide monomer followed by hydrolysis thereof. A formula weight ratio of vinylalcohol units and the introduced cationic groups of 1:20 to 2:1 is preferable in terms of balanced performance.

12 Claims, No Drawings

SHEET SURFACE TREATING AGENT AND INK-JET PRINTING PAPER

TECHNICAL FIELD

The present invention relates to a treating agent for a sheet surface and a paper for ink jet printing which is applied with the treating agent.

BACKGROUND ART

Ink jet printing is a non-contact printing method that offers numerous advantages including high-speed printing, printing at low noise levels, ease of performing color printing, or the like, and consequently has been rapidly popularized for use in printers and plotters. Ink jet printing allows printing on ordinary printing paper, coated paper, PPC paper (paper for plain paper copy), medium-quality paper and even plastic film.

As a paper for use in ink jet printing, there is a coated paper for obtaining a high image quality, which has a coating layer containing synthetic silica or the like. In contrast, as low-priced common-use paper, one obtained by penetrate-treating paper with starch or the like by means of a size press is used. Common-use paper has the major problem of the occurrence of so-called feathering when it is printed with an aqueous ink which is used in the ink jet printing.

Since the ink used for the ink jet printing is both aqueous and anionic, a cationic waterproofing agent is applied to the surface of the paper. Although it is effective to coat or penetrate-treat paper with a cationic polymer to improve water resistance, this results in the occurrence of the problem of decreased color density during printing.

Various methods have been proposed to inhibit this decrease in color density, examples of which include a method wherein nonionic resin fine particles are combined with nonionic, anionic or cationic water-soluble polymer and coated (Japanese Patent Laid-Open Publication No. 9-1925), a method wherein emulsion particles are coated which are synthesized by copolymerization of acrylonitrile and acrylic esters to increase printing density (Japanese Patent Laid-Open Publication No. 8-50366), a method wherein cationic emulsion particles of acrylic esters are coated (Japanese Patent Laid-Open Publication No. 9-99632), and a method wherein colloidal silica and a water-soluble polymer are coated for the purpose of improving dye color development and printing density (Japanese Patent Laid-Open Publication No. 9-109544).

However, since all of these methods use water-insoluble fine particles, they bond weakly with the ink dye for ink jet printing, and the water-soluble cationic polymer that is used in combination with them does not demonstrate adequate water resistance.

In addition, the use of a mixture of polymer having vinylalcohol units such as polyvinyl alcohol and a cationic polymer for ink jet printing paper is known. Polyvinyl alcohol has a good film-forming ability, and has the effect of inhibiting decreases in color density. On the other hand, cationic polymers have the effect of increasing water resistance.

However, polyvinyl alcohol and cationic polymer have poor miscibility, and it is difficult to apply their mixture uniformly in the microscopic state. Consequently, these substances have shortcomings that include large decreases in color density, thereby requiring further improvement.

The use of a copolymer comprising a polymer moiety having vinyl alcohol units and a polymer moiety having cationic monomer units for ink jet printing paper as being useful in the present invention has heretofore been unknown.

Moreover, due to the considerable increase in viscosity that occurs when a conventional cationic polymer or the like is mixed into a coating color, it is necessary to dilute with water at the time of application. Thus, the polymer concentration is unable to be increased, and the coated amount of the polymer ends up being low, which had previously presented a problem. A surface treating agent that is able to effectively solve the problems of decreased quality, namely decreased color density, feathering and insufficient water resistance as mentioned above has yet to be developed. In addition, the light resistance of printed ink images or characters is also insufficient.

DISCLOSURE OF THE INVENTION

An object of the present invention is to provide a treating agent for a sheet surface that improves water resistance and light resistance without decreasing color density during printing when printing with an aqueous ink, for example, one used in ink jet printing.

Another object of the present invention is to provide a treating agent for a sheet surface that prevents the problem of feathering that particularly occurs with common-use paper for ink jet printing.

A further object of the present invention is to provide a treating agent for a sheet surface that prevents the occurrence of the considerable increase in viscosity when mixed with coating colors and can be applied in a sufficient polymer concentration.

A still further object of the present invention is to provide a coated paper for ink jet printing that improves water resistance and light resistance without decreasing color density during printing. A still further object of the present invention is to provide a common-use paper for ink jet printing that prevents feathering without decreasing color density during printing, and improves water resistance and light resistance.

As a result of earnest studies to solve the above-mentioned problems, the inventors of the present invention found that miscibility between polyvinyl alcohol and cationic polymers, which had presented a problem in the prior art, is improved by using a copolymer comprising a polymer moiety having vinyl alcohol units and a polymer moiety having cationic groups, especially a graft copolymer containing vinyl alcohol units for either a back bone polymer or branch polymers while the other has cationic groups, and that by treating sheet surface such as paper, offering an excellent printing without decreasing color density as well as better water resistance and light resistance than current commercially available paper, thereby leading to completion of the present invention. Furthermore, the occurrence of feathering can be prevented thereby.

In the preferred embodiments, the copolymer has the polymer moieties which are a back bone polymer and a branch polymer, and is a graft copolymer composed of the back bone polymer and branch polymer, either of which is a polymer having vinyl alcohol units, and the other of which is a polymer having cationic groups.

Furthermore, the present invention is to provide the above described treating agent for a sheet surface, in which the back bone polymer of the graft copolymer is composed of water-soluble polymer having vinyl alcohol units, and the branch polymer is composed of at least one repeating unit selected from the group consisting of a repeating unit represented by the following formula (1), a repeating unit represented by the following formula (2), a repeating unit represented by the following formula (3) and a repeating unit represented by the following formula (4):

[Formula (1)]

(1)

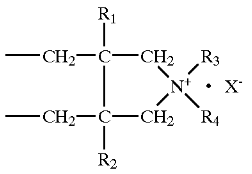

(wherein, $R_1$ and $R_2$ represent H or $CH_3$, $R_3$ and $R_4$ represent hydrogen, alkyl groups having 1~4 carbon atoms or benzyl groups, and $X^-$ represents a counter ion);

[Formula (2)]

(2)

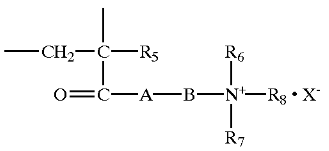

(wherein, A represents O or NH, B represents $C_2H_4$, $C_3H_6$ or $C_3H_5OH$, $R_5$ represents H or $CH_3$, $R_6$ and $R_7$ represent alkyl groups having 1~4 carbon atoms, $R_8$ represents hydrogen, an alkyl group having 1~4 carbon atoms or a benzyl group, and $X^-$ represents a counter ion);

[Formula (3)]

(3)

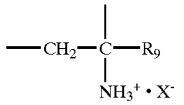

(wherein, $R_9$ represents H or $CH_3$, and $X^-$ represents a counter ion); and

[Formula (4)]

(4)

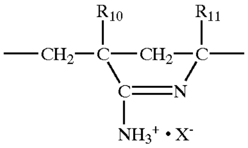

(wherein, $R_{10}$ and $R_{11}$ represent H or $CH_3$, and $X^-$ represents a counter ion).

In the preferred embodiments, the branch polymer comprises at least one repeating unit selected from the group consisting of the repeating unit represented by the formula (1) and the repeating unit represented by the formula (2). Furthermore, in the preferred embodiments the branch polymer comprises the repeating unit represented by the formula (1) and the repeating unit represented by the formula (3) and/or the repeating unit represented by the formula (4).

In addition, in the preferred embodiments, the graft copolymer can be obtained by radical polymerization of a monomer composition generating at least one repeating unit selected from the group consisting of the repeating unit represented by the formula (1), the repeating unit represented by the formula (2), the repeating unit represented by the formula (3), and the repeating unit represented by the formula (4) in the presence of the water-soluble polymer having vinyl alcohol units.

Furthermore, in the preferred embodiments, the formula weight ratio of vinyl alcohol units of the water-soluble polymer having vinyl alcohol units and the cationic groups is from 1:20 to 2:1.

Still further, the proportion of vinyl alcohol units contained in the water-soluble polymer having vinyl alcohol units is preferably from 70 mol % to 100 mol %.

In the radical polymerization reaction, the pH of the reaction system may be preferably from 1.0 to 6.0.

Furthermore, the degree of polymerization of the water-soluble polymer having vinyl alcohol units may be preferably from 100 to 2500.

Further, in the preferred embodiments, the water-soluble polymer having vinyl alcohol units may be grafted by 40% or more by radical polymerization.

In addition, methanol is added in an amount 10 times a weight of a polymer aqueous solution in which the concentration of the polymer mixture after the grafting reaction is 20 wt %, to form precipitate, and the amount of dry matter of the formed precipitate may be preferably 60 wt % or less of the water-soluble polymer having vinyl alcohol units used as raw material.

Further, the intrinsic viscosity of the polymer mixture after grafting reaction in 2% aqueous ammonium sulfate solution at 25° C. may preferably be from 0.1 to 2.0 dl/g.

Still further, monomer generating the repeating unit represented by the formula (1) may preferably be a salt of diallylamine, a salt of diallylmonomethylamine, or a salt of diallyldimethylamine.

In addition, monomer generating the repeating unit represented by the formula (2) may preferably be a salt or quaternary compound of a dialkylaminoethyl(meth)acrylate or a salt or quaternary compound of a dialkylaminopropyl (meth)acrylamide.

In addition, in the preferred embodiments monomer generating the repeating unit represented by the formula (3) is N-vinylformamide or N-vinylacetamide.

Furthermore, monomer generating the repeating unit represented by the formula (4) may preferably be a monomer composition of N-vinylformamide and acrylonitrile.

Still further, the present invention is to provide the above treating agent for a sheet surface, in which the graft copolymer is a graft copolymer in which vinyl ester of carboxylic acid is graft copolymerized with a polymer of a monomer containing N-vinylcarboxylic acid amide or a hydrolysis product of the polymer as the back bone polymer raw material to form the branch polymer, and the branch polymer is made to contain vinyl alcohol units by hydrolyzing the resulting graft copolymer.

Furthermore, the present invention is to provide a paper for ink jet printing prepared by coating a coating color comprising the above described treating agent for a sheet surface, a filler, and a binder onto a sheet surface.

Further, the present invention is to provide a paper for ink jet printing prepared by making a treating solution comprising the above mentioned treating agent for a sheet surface penetrate into a sheet surface.

Furthermore, the paper preferably comprises the treating agent for a sheet surface of 0.02 to 5 $g/m^2$.

BEST MODE FOR CARRYING OUT THE INVENTION

The present invention is described in detail hereinafter.

The treating agent for a sheet surface according to the present invention comprises a copolymer comprising a polymer moiety having vinyl alcohol units and a polymer moiety having cationic groups. Examples of such a copolymer include a block copolymer, a graft copolymer or the like.

Especially, a graft copolymer in which the polymer moieties are a back bone polymer and branch polymers, either the back bone polymer or branch polymer is a polymer having vinyl alcohol units, and the other is a polymer having cationic groups, may be preferably used for the treating agent for a sheet surface according to the present invention. Particularly, a graft copolymer having vinyl alcohol units for its back bone polymer may be preferably used. The graft copolymer of the present invention can be obtained by grafting monomers having a structure necessary on a water-soluble polymer having vinyl alcohol units or by following hydrolysis.

The water-soluble polymer containing vinyl alcohol units that serves as the raw material of the present invention may be preferably obtained by alkaline hydrolysis of a homopolymer of vinyl ester of carboxylic acid, or a copolymer of a vinyl ester of carboxylic acid with copolymerizable monomers. Since polyvinyl alcohol, a hydrolysis product of polyvinyl acetate, is widely used in practical terms, polyvinyl alcohol that is a hydrolysis product of polyvinyl acetate may be most preferably used in the present invention as well.

Examples of vivyl esters of carboxylic acids include vivyl formate, vinyl acetate, vinyl propionate, vinyl butyrate and vinyl benzoate.

In addition, typical examples of the above-mentioned copolymerizable monomers include nonionic, cationic or anionic monomers such as ethylene, styrene, salts or quaternary compounds of dimethylaminopropyl(meth) acrylamide, salts or quaternary compounds of diallylamine, N-vinylformamide, N-vinylacetamide, vinylsulfonate, acrylamido-2-methyl-propanesulfonate, (meth)acrylic acid, itaconic acid, dimethylacrylamide and N-isopropylacrylamide.

Vinyl alcohol units are typically formed within the polymer by alkaline hydrolysis of a homopolymer or copolymer of these monomers.

In the present invention, the vinyl alcohol units in the water-soluble or water-dispersible polymer having vinyl alcohol units are preferably 70~100 mol %, more preferably 85~100 mol %, and are considered to become the back bone polymer of the graft copolymer. In the case the vinyl alcohol units are outside this range, the grafting rate decreases, thereby preventing the object of the present invention from being achieved.

The degree of polymerization of the water-soluble polymer having vinyl alcohol units such as polyvinyl alcohol is preferably 100 to 2500, and more preferably 300 to 2000, and a polymer having an arbitrary degree of polymerization can be used according to the objective.

It is preferable that the branch polymers of the graft copolymer contain cationic repeating units represented by the above-mentioned formula (1), formula (2), formula (3), or formula (4). These repeating units may be present in the branch polymers either alone or a plurality of kinds thereof simultaneously.

In the present invention, a graft copolymer composed of a polymer moiety having vinyl alcohol units and a polymer moiety having cationic groups can be realized by polymerizing monomer composition generating the cationic repeating units represented by the above-mentioned formula (1) and/or formula (2) in the presence of the water-soluble polymer having vinyl alcohol units that serves as the back bone polymer.

In addition, a monomer composition comprising a monomer generating the repeating unit represented by the above mentioned formula (1) and a monomer generating the repeating unit represented by the above mentioned formula (3) and/or a monomer generating the repeating unit represented by the above mentioned formula (4) can be used as a monomer composition in the present invention. By forming the branch polymer of these monomers followed by alkali or acid hydrolyzing it, a graft copolymer of the present invention can be obtained, which is introduced with the repeating units represented by the above mentioned formulas (1) and (3) and/or (4).

A graft copolymer having as its branch polymers cationic repeating units represented by the above-mentioned formulas (3) or (4) can be obtained by graft copolymerizing N-vinylcarboxylic acid amide monomer or a monomer composition of N-vinylcarboxylic acid amide monomer and acrylonitrile instead of the repeating units represented by the formula (1) or formula (2) to the above-mentioned water-soluble polymer having vinyl alcohol units, followed by hydrolysis thereof.

In this system, however, three types of polymers are present in the form of a mixture, namely polymers of a cationic monomer that have not been graft polymerized, the above-mentioned ungrafted water-soluble polymers having vinyl alcohol units, and the formed graft copolymer. The present invention effectively demonstrates prevention of feathering and improvement of water resistance even if this mixture is used as a treating agent for a sheet surface.

The graft copolymer demonstrates good effects as a treating agent for a sheet surface even if it is not isolated, but rather in the state of a mixture with the polymers. Thus, in this case, a complex isolation process is not required thereby further enhancing the practical value of the present invention with respect to decreased production cost and so forth.

The treating agent for a sheet surface of the present invention can be prepared by radical polymerizing di(meth) allylamine-based monomers generating the repeating unit represented by the above-mentioned formula (1) and/or (meth) acrylic cationic monomers generating the repeating unit represented by the above-mentioned formula (2) after dissolving or dispersing water-soluble polymers having vinyl alcohol units in an aqueous medium.

Examples of di(meth)allylamine-based monomers generating the repeating unit represented by the above-mentioned formula (1) referred to here include salts of di(meth) allylamine, salts or quaternary compounds of di(meth) allylmonoalkylamines, and salts or quaternary compounds of di (meth)allylbenzylamines. Examples of salts referred to here include hydrochlorides, sulfates and acetates. Examples of quaternary amine compounds include quaternary compounds with methylhalides or benzylhalides.

Preferred examples include hydrochlorides, sulfates, acetates and quaternary compounds from diallylamine, diallylmonomethylamine, or diallylbenzylamine with methylhalides.

Specific examples of these compounds include monomethylbenzyldiallylammonium chloride, dimethyldiallylammonium chloride, diallylamine hydrochloride, diallylamine sulfate and diallylamine acetate, while dimethyldiallylammonium chloride is particularly preferable.

In addition, specific examples of (meth)acrylic cationic monomers generating the repeating unit represented by the above-mentioned formula (2) referred to here include salts or quaternary compounds of dialkylaminoethyl(meth) acrylate and salts or quaternary compounds of dialkylaminopropyl(meth)acrylamides. Examples of salts referred to here include hydrochlorides, sulfates and acetates. Examples of quaternary amine compounds include quaternary compounds with methylhalides and benzylhalides.

Specific examples of these compounds that are particularly preferable include quaternary ammonium salts such as (meth)acryloyloxyethyldimethylbenzylammonium chloride, (meth)acryloyloxyethyltrimethylammonium chloride, (meth)acryloylaminopropyldimethylbenzylammonium chloride and (meth) acryloylaminopropyltrimethylammonium chloride, while dimethylaminoethyl(meth)acrylate salts, such as hydrochlorides, sulfates and acetates, as well as dimethylaminopropyl (meth)acrylamide salts, such as hydrochlorides, sulfates and acetates, can be used preferably.

Furthermore, the repeating units represented by these formulas (1) and/or (2) maybe introduced from alone or a mixture of aplurality of kinds of monomers.

Together with the above-mentioned cationic monomers, nonionic (meth)acrylic monomers, anionic (meth) acrylic monomers or various types of vinyl monomers can also be copolymerized.

In addition, cationic repeating units represented by the above-mentioned formula (3) can be introduced by graft copolymerizing N-vinylcarboxylic acid amide to water-soluble polymer having vinyl alcohol units using a similar preparative method followed by hydrolysis thereof. On the other hand, cationic repeating units represented by the above-mentioned formula (4) can also be introduced by graft copolymerizing N-vinylcarboxylic acid amide and acrylonitrile to water-soluble polymer having vinyl alcohol units using a similar preparative method followed by hydrolysis thereof. N-vinylacetamide or N-vinylformamide can be used for the N-vinylcarboxylic acid amide. Further, in the above graft copolymerization, the monomer generating the repeating unit represented by the above mentioned formula (1) can be graft copolymerized because of its hydrolysis resistance.

The grafting rate of graft copolymers can be analyzed by nuclear magnetic resonance or infrared spectroscopy. In addition, the weight ratio of methanol insoluble matter to the charged amount of raw material polymer can be used as an indicator of the grafting rate of the back bone polymer by utilizing the property in which the solubility in methanol of the back bone polymer increases as a result of grafting.

Namely, as grafting proceeds, the raw material polymer that has become highly cationic also becomes soluble in methanol and is filtered out. The weakly cationic grafted polymer becomes insoluble in methanol and is measured. Thus, the difference between the charged amount of raw material polymer and the amount of insoluble matter is the amount of grafted polymer that has become highly cationic, and is considered to indicate the minimum value of the grafting rate of the raw material polymer.

More specifically, methanol is added in an amount 10 times a weight of a polymer aqueous solution in which the concentration of polymer mixture after performing the polymerization procedure of the present invention (concentration calculated from the sum of the amount of polymer such as polyvinyl alcohol charged as raw material and the amount of charged monomers for graft copolymerization) is 20 wt %. The formed precipitate is filtered with No. 5B filter paper and dried to a constant weight at 105° C. to determine the amount of insoluble matter. The weight ratio is then determined between this amount of insoluble matter and the amount of charged polymer (such as polyvinyl alcohol).

In the present invention, it is preferable that the amount of insoluble matter be 60 wt % or less.

Namely, it is preferable that at least 40% of back bone polymer charged as raw material be grafted.

Since homopolymers of cationic monomers are also soluble in methanol, this assay method is only valid as an indicator of grafting rate of the back bone polymer.

If a method is developed for determining the grafting rate of the cationic monomers as well, it would be possible to more specifically stipulate the desirable composition of graft copolymer, the findings of the inventors of the present invention only apply to the grafting ratio of the back bone polymer.

The formula weight ratio of the vinyl alcohol units of water-soluble polymer having vinyl alcohol units serving as raw material in the present invention and the above-mentioned cationic groups is selected from the range of 1:20 to 2:1. This range is preferably 1:20 to 1:1, and most preferably 1:20 to 1:2. Graft copolymer produced within this range is particularly preferable as a treating agent for a sheet surface.

If the amount of water-soluble polymer having vinyl alcohol units is less than 4.7 formula wt %, the effect on color density is too large, making it unsuitable for use as a treating agent for a sheet surface. If the amount of the above-mentioned cationic groups is less than 33 formula wt %, it is not practical as a result of low water resistance.

Graft copolymerization is carried out in a monomer solution in the presence of water-soluble polymer having vinyl alcohol units in an aqueous medium. Although water alone is preferably used as the aqueous medium, organic solvents which mix uniformly with water, such as dimethylsulfoxide, ethanol and N-methylpyrrolidone, may also be mixed with water.

For the polymerization method, the entire amount of monomer is charged into a polymerization vessel in the presence of water-soluble polymer having vinyl alcohol units followed by initiation of polymerization, or a portion of the monomer is charged into the polymerization vessel, and remaining monomer is then charged according to the progress of polymerization after initiating polymerization. Either method may be suitably employed.

The water-soluble polymer having vinyl alcohol units to serve as the back bone polymer is present in the polymerization system in the dissolved state at a concentration of 2 to 25 wt %, while monomer to be grafted is present in the polymerization system at a monomer concentration of 5 to 60 wt %. Cationic monomer is then graft copolymerized to the back bone polymer by solution polymerization, reverse phase emulsion polymerization, reverse phase suspension polymerization and so forth, and particularly preferably by aqueous solution polymerization.

In addition, a graft copolymer can be obtained and used in a similar application, where the graft copolymer has a polymer structure having cationic groups for the back bone polymer, and apolymer structure having vinyl alcohol units for the branch polymers, by graft copolymerizing a vinyl ester of carboxylic acid such as vinylacetate for composing the branch polymers with a (co)polymer containing N-vinylcarboxylic acid amide and/or hydrolysis product of the (co)polymer as back bone polymer, followed by hydrolysis thereof.

The graft copolymerization of the present invention can be performed by polymerizing under the above-mentioned conditions using an ordinary radical generator.

Examples of ordinary radical generators that are used preferably include azo-based initiators such as 2-2'-azobis-2-amidinopropane.2 hydrochloride, sodium 4,4'-azobis-4-cyanovalerate and 2,2'-azobis-N,N'-dimethyleneisobutylamidine.2 hydrochloride.

In addition, in place of the use of these azo-based initiators, oxidizing initiators such as tetravalent cerium compounds or redox-type initiators in the manner of a combination of ammonium persulfate and sodium hydrogen sulfite can be either used in combination or alone.

The amount of polymerization initiator used is normally about 100 to 10,000 ppm relative to the amount of monomers.

If there is necessity to adjust molecular weight of polymer, it is performed by using a general chain transfer agent such as alcohols such as methanol, ethanol or isopropanol, or sulfur-containing compounds such as 2-mercaptoethanol. The amount used thereof is 0.1 to 200 wt % relative to the amount of monomers in the case of alcohols, and 0.01 to 10 wt % relative to the amount of monomers in the case of 2-mercaptoethanol.

The polymerization reaction is typically carried out at a temperature of 10° C. to 100° C., and preferably 30° C. to 80° C., and within a pH range of 1.0 to 6.0, and particularly preferably pH 2.0 to 5.0 after removing oxygen gas from the system. If the polymerization reaction is carried out at a pH outside the above range, grafting reaction does not proceed there by preventing the object of the present invention from being achieved.

The polymer mixture obtained by the graft copolymerization having an intrinsic viscosity at 25° C. in 2% ammonium sulfate aqueous solution of 0.1 to 2.0 dl/g is preferable as a treating agent for a sheet surface, while that having an intrinsic viscosity of 0.2 to 0.5 dl/g is particularly preferable. If the viscosity is outside the above range, it does not fall within the suitable viscosity range during treating, thereby preventing the obtaining of good treating.

Examples of sheets to be treated with the treating agent for a sheet surface of the present invention include pulp sheet such as high-quality paper, medium-quality paper, paperboard, synthetic paper and plastic sheet. It is also applicable to a composite sheet comprising paper and synthetic paper, or the like.

The treating agent for a sheet surface according to the present invention can be applied in other printing method using a similar aqueous ink like the ink jet printing.

The amount in the case of treating a paper surface with the treating agent of the present invention should be determined by taking into consideration the required properties. In general, the applied polymer content of the treating agent is within the range of 0.02 to 5 g/$m^2$. In the case of coated paper, the paper for ink jet printing according to the present invention can be produced by preparing a coating color composed of fillers, binders and the treating agent for a sheet surface of the present invention and coating a sheet surface with the coating color. In the case of common-use paper, the paper for ink jet printing according to the present invention can be produced by penetrate treating a sheet surface with the treating agent for a sheet surface of the present invention alone or in combination with oxidized starch, polyvinyl alcohol or surface sizing agent and so forth.

The treating agent for a sheet surface according to the present invention can be used in combination with other coating agents, examples of which include ink charge neutralizing substances such as cationic surface active agents, polycondensed aluminum ions and polycondensed cationic polymers, water-soluble polymers and latex such as oxidized starch, cationic starch, modified starch and polyvinyl alcohol, and coating pigments or fillers for ink jet printing such as fine synthetic silica, alumina, talc, kaolin clay and calcium carbonate.

The paper for ink jet printing according to the present invention can be obtained by treating a sheet surface with the treating agent for a sheet surface according to the present invention alone or a treating solution of the mixture of the treating agent of the present invention with other coating agents by use of a size press, a gate roll coater or a blade coater and so forth.

The treating agent for a sheet surface of the present invention can be obtained that is composed of a graft copolymer comprising a back bone polymer (main chain) and branch polymers (side chains), with one having a polymer structure having vinyl alcohol units, while the other has a polymer structure having cationic groups. Generally polyvinyl alcohol and cationic polymer have a low level of miscibility with each other. On the other hand, the roles of both differ when used as a treating agent for an ink jet printing paper. The cationic polymer increases water resistance, while the polyvinyl alcohol demonstrates the effect of preventing a decrease in color density. Although both components cannot be coated onto a paper surface as a uniform phase when in the form of a simple mixture, in the presence of the graft copolymer of the present invention, since the graft copolymer itself is a uniform phase, especially in a case where a water-soluble binder like polyvinyl alcohol is used as a binder, it improves the miscibility of the binder and cationic polymer, thereby enabling various types of polymers to be applied to a paper surface in a uniform state.

Moreover, the treating agent for a sheet surface of the present invention is recognized to have an effect that prevents increases in viscosity of a coating color during mixing, thereby contributing to performance by allowing a large amount of polymer to be coated onto the paper. The effect of preventing increases in viscosity of a coating color is also surmised to be the result of improved miscibility between the polyvinyl alcohol and cationic polymer components. In this manner, as a result of having the characteristic of allowing uniform coating of a large amount of polymer, the paper for ink jet printing coated with the present graft copolymer can be given desirable properties.

EMBODIMENTS

Although the following provides a detailed explanation of the present invention according to its embodiments, the present invention is not limited to the following embodiments provided its gist is not exceeded.

SYNTHESIS EXAMPLE-1

52.2 g of a 23% aqueous solution of polyvinyl alcohol (abbreviated as PVA) (trade name: PVA205 (saponification index: 88%, degree of polymerization: 500) manufactured by Kurare Co.), 166 g of dimethyldiallylammonium chloride (DADMAC, concentration 65%, manufactured by Daiso Co.) (abbreviated as DDMC) and 44.6 g of deionized water were added to a 500 ml four-neck flask equipped with a thermometer, stirrer, nitrogen feed tube and condenser, after which the pH of the raw material mixed liquid was adjusted to 3.5 with 2.4 g of 10% aqueous sulfuric acid, and the monomer concentration was adjusted to 40.8%.

Nitrogen replacement was performed for 30 minutes while stirring the raw material mixture and maintaining the temperature at 60° C. After then, 5.4 g (0.5 wt % per monomer) of a 10% aqueous solution of polymerization initiator V-50 (2,2'-azobis-amidinopropane dihydrochloride: manufactured by Wako Pure Chemical Industries Co.) were added to start polymerization.

After maintaining the temperature at 60° C. for 4 hours, 0.2 wt % per monomer of polymerization initiator V-50 was further added, and the reaction continued for 8 hours after its initiation. After cooling, 130 g of deionized water were added to being the total amount to 400 g and obtain a uniform reaction product. The polymer concentration as determined from the total of PVA and DDMC was 30%. This polymer mixture was designated as Sample-1.

The cation equivalent value of the Sample-1 (pure polymer content) was measured by colloidal titration. At this time, the formula weight ratio of hydroxyl groups as determined from the saponification index of PVA and cation groups as determined by colloidal titration was 26:74.

In addition, the intrinsic viscosity of the Sample-1 at 25° C. in 2% ammonium sulfate aqueous solution was measured.

In addition, after removing 3.6 g of a 20% solution thereof, 36.0 g of methanol were added to form precipitate. The insoluble precipitate that formed at this time was filtered with No. 5B filter paper. After drying it for 1 hour at 105° C., the dried precipitate was weighed to calculate the weight ratio (% insoluble matter) of methanol-insoluble matter relative to the polyvinyl alcohol charged as raw material.

Polymer properties are shown in Table 1.

(saponification index: 98%, degree of polymerization: 500) manufactured by Kurare Co. as polyvinyl alcohol and using the charged amounts of PVA105 and DDMC shown in Table 1 to obtain Samples-3 and 4.

The properties of these polymers are shown in Table 1.

COMPARATIVE SYNTHESIS EXAMPLE-1

Polymerization of DDMC was performed according to the same procedure as the Synthesis Example-1 without adding PVA to obtain polydimethyldiallylammonium chloride (P-DDMC), and a polymer mixture obtained by mixing an equal amount of PVA as that used in the Synthesis Example-1 with the P-DDMC was designated as Comparative Sample-1. The Comparative Sample-1 separated into 2 phases, and again separated into 2 phases within 1 day even after mixed with a homogenizer.

The cation equivalent value, the intrinsic viscosity, and the weight ratio (% insoluble matter) of methanol-insoluble matter of the Comparative Sample-1 were measured in accordance with the same procedure as Synthesis Example-1. Polymer properties are shown in Table 1.

Furthermore, a polymer mixture obtained by mixing an equal amount of the Sample-1 with the Comparative Sample-1 did not separate into 2 phases and was designated as Mixed Sample-1 according to the present invention.

COMPARATIVE SYNTHESIS EXAMPLES-2~4

The same polymerization procedures as the Comparative Synthesis Example-1 were performed using the charged amounts of PVA and P-DDMC shown in Table 1 to obtain Comparative Samples-2~4.

The properties of these polymers are shown in Table 1.

TABLE 1

| Name of Sample | PVA | Kind of Monomer | Formula weight ratio VA:Cationic Group | Cationic Equivalent Value (meq/g) | Intrinsic Viscosity (g/dl) | Insoluble Matter (%) |
|---|---|---|---|---|---|---|
| Sample-1 | PVA205 | DDMC | 26:74 | 5.57 | 0.39 | 25 |
| Sample-2 | PVA205 | DDMC | 33:67 | 5.37 | 0.20 | 40 |
| Sample-3 | PVA105 | DDMC | 21:79 | 5.70 | 0.30 | 10 |
| Sample-4 | PVA105 | DDMC | 50:50 | 4.71 | 0.51 | 50 |
| Comparative Sample-1 | PVA205 | DDMC | 26:74 | 5.57 | 0.40 | 100 |
| Comparative Sample-2 | PVA205 | DDMC | 33:67 | 5.37 | 0.21 | 100 |
| Comparative Sample-3 | PVA105 | DDMC | 21:79 | 5.70 | 0.30 | 100 |
| Comparative Sample-4 | PVA105 | DDMC | 50:50 | 4.71 | 0.50 | 100 |

DDMC: dimethyldiallylammonium chloride
VA: vinylalcohol units

SYNTHESIS EXAMPLES-2

The same polymerization procedure as the Synthesis Example-1 was performed except for using the charged amounts of PVA205 and DDMC shown in Table 1 to obtain Samples-2.

The properties of the polymer are shown in Table 1.

SYNTHESIS EXAMPLES-3, 4

The same polymerization procedures as the Synthesis Example-1 were performed except for using PVA105

EXAMPLES 1~5, COMPARATIVE EXAMPLES 1~5

Application of Treating Agent for a Sheet Surface

Synthetic powdered silica (Nipseal HD-2, manufactured by Nippon Silica Kogyo Co.), polyvinyl alcohol (PVA105 (saponification index: 98%, degree of polymerization: 500) manufactured by Kurare Co.), the treating agents for a sheet surface (Samples-1~4 or Comparative Samples-1~4) were mixed in the proportion of a weight ratio of 50:45:5 to prepare coating colors having a concentration of 25%.

After coating 8.0 $g/m^2$ (Sample and Comparative Sample polymer amount of 0.4 $g/m^2$) of these coating colors onto commercially available PPC papers (Stoeckigt sizing degree: approx. 20 seconds) using a wire bar (PDS04, manufactured by Wavestar Co.), the coated papers were dried for 2 minutes at 105° C. and then used in printing and later testing.

Printing of Test Paper and Measurement of Water and Light Resistance

Cyan, magenta, yellow and black patterns and characters were printed on the coated test papers using the BJC-600J ink jet printer manufactured by Canon Co.

Color densities after printing were measured with an NR-3000 calorimeter (manufactured by Nihon Denshoku Co.) indicating as L*, a* and b*. Cyan was evaluated with the value of −b*, magenta with the value of a*, yellow with the value of b* and black with the value of L*.

Changes in color densities before and after water resistance and light resistance tests were measured using an RD-918 Macbeth reflection densitometer.

The water resistance test was performed by measuring color density before and after immersing a solid-printed test piece in deionized water (flowing water) moving at 300 ml/min for 10 minutes, and then calculating the rate A, B and C of residual color. A: not changed, B: slightly blurred, C: significantly blurred The light resistance test was conducted by illuminating a solid-printed test piece for 40 hours at an illumination intensity of 500 $W/m^2$, wavelength of 300~800 nm and temperature of 50° C. using a light resistance tester (manufactured by Shimadzu Co., XS-180CPS), measuring the color density before and after illumination, and calculating the rate A, B and C of residual color. A: not changed, B: slightly faded, C: faded.

The results of each measurement are shown in Table 2.

SYNTHESIS EXAMPLES-5~8

A 23% aqueous solution of polyvinyl alcohol (abbreviated as PVA) (trade name: PVA117 (saponification index: 98%, degree of polymerization: 1700) manufactured by Kurare Co.) and monomers having the compositions described in Table 3 were charged into a 500 ml four-neck flask equipped with a thermometer, stirrer, nitrogen feed tube and condenser, after which the pH was adjusted to 3.5 and the monomer concentration was adjusted to 20% by addition of deionized water. Nitrogen replacement within the system was performed for 30 minutes while stirring the raw material mixture and maintaining the temperature at 66° C. Next, 0.3 wt % (per monomer) of ammoniumperoxodisulfate and 0.01 wt % (per monomer) of sodium hydrogen sulfite were added to initiate polymerization. The reaction was allowed to continue for 4 hours while maintaining the reaction system at 60° C. and then cooled to obtain a uniform product. These polymer mixtures were designated as Samples-5~8.

The cation equivalent values, the intrinsic viscosities, and the weight ratio (% insoluble matter) of methanol-insoluble matter of the Samples-5~8 were measured by the same procedures as the Synthesis Example-1. Polymer properties are shown in Table 3.

COMPARATIVE SYNTHESIS EXAMPLES-5~8

With the exception of polymerizing at the pH values described in Table 3, monomers were polymerized using the same procedure as the Synthesis Examples-5~8 to obtain Comparative Samples-5~8. The pH values thereof were adjusted with hydrochloric acid and sodium hydroxide.

The Comparative Samples-5~8 separated into 2 phases, and again separated into 2 phases within 1 day even when mixed with a homogenizer.

The cation equivalent values, the intrinsic viscosities, and the weight ratio (% insoluble matter) of methanol-insoluble matter of the Comparative Samples-5~8 were measured by the same procedures as the Synthesis Example-1. Polymer properties are shown in Table 3.

TABLE 2

| | | Water Resistance | | | | Light Resistance | | | | Color Density | | | |
|---|---|---|---|---|---|---|---|---|---|---|---|---|---|
| | | | | | | | | | | C | M | Y | B |
| | Name of Sample | C | M | Y | B | C | M | Y | B | (−b*) | (a*) | (b*) | (L*) |
| Example 1 | Mixed Sample-1 | A | B | A | A | A | B | A | A | 43.1 | 64.1 | 75.0 | 33.5 |
| Example 2 | Sample-1 | A | B | A | A | A | B | A | A | 43.4 | 64.0 | 75.1 | 33.0 |
| Example 3 | Sample-2 | A | B | A | A | A | B | A | A | 43.2 | 64.4 | 75.8 | 33.5 |
| Example 4 | Sample-3 | A | B | A | A | A | B | A | A | 43.1 | 64.0 | 75.9 | 33.0 |
| Example 5 | Sample-4 | A | B | A | A | A | B | A | A | 44.1 | 63.8 | 75.5 | 33.2 |
| Comparative Example 1 | Comparative Sample-1 | B | C | A | B | A | C | A | A | 42.3 | 63.0 | 73.2 | 35.4 |
| Comparative Example 2 | Comparative Sample-2 | B | C | A | B | A | C | A | A | 42.6 | 63.7 | 73.0 | 35.0 |
| Comparative Example 3 | Comparative Sample-3 | B | C | A | B | A | C | A | A | 39.5 | 62.1 | 72.0 | 35.5 |
| Comparative Example 4 | Comparative Sample-4 | B | C | A | B | A | C | A | A | 44.2 | 64.0 | 73.5 | 34.6 |
| Comparative Example 5 | Comparative Sample-1* | A | B | A | A | A | B | A | A | 33.8 | 49.0 | 52.3 | 27.5 |

C: cyan, M: magenta, Y: yellow, B: black

*Coating color having a concentration of 25% was prepared by mixing synthetic silica, polyvinyl alcohol, and Comparative Sample-1 in a weight ratio of 50:45:10.

TABLE 3

| Name of Sample | Formula weight ratio VA:Cationic Group | Kind of Monomer | Polymerization pH | Cationic Equivalent Value (meq/g) | Intrinsic Viscosity (g/dl) | Insoluble Matter (%) |
|---|---|---|---|---|---|---|
| Sample-5 | 25:75 | DAMC | 2.5 | 4.70 | 0.39 | 35 |
| Sample-6 | 25:75 | DPMC | 3.5 | 4.50 | 0.39 | 20 |
| Sample-7 | 25:75 | DABC | 3.5 | 3.50 | 0.41 | 10 |
| Sample-8 | 25:75 | DPBC | 4.5 | 3.30 | 0.42 | 44 |
| Comparative Sample-5 | 25:75 | DAMC | 0.0 | 4.70 | 0.40 | 99 |
| Comparative Sample-6 | 25:75 | DPMC | 7.0 | 4.50 | 0.41 | 99 |
| Comparative Sample-7 | 25:75 | DABC | 0.5 | 3.50 | 0.42 | 98 |
| Comparative Sample-8 | 25:75 | DPBC | 6.5 | 3.30 | 0.39 | 98 |

DAMC: acryloyloxyethyltrimethylammonium chloride
DPMC: acryloylaminopropyltrimethylammonium chloride
DABC: acryloyloxyethylbenzyldimethylammonium chloride
DPBC: acryloylaminopropylbenzyldimethylammonium chloride
VA: vinylalcohol units

EXAMPLE-6~9, COMPARATIVE EXAMPLE-6~9

Evaluation Test for Treating Agent for a Sheet Surface

Polyvinyl alcohol (trade name: PVA105 (saponification index: 98%, degree of polymerization: 500) manufactured by Kurare Co.), oxidized starch (Ace C, manufactured by Oji Cornstarch Co.) and treating agents (Samples-5~8, Comparative Samples-5~8) were mixed in a weight ratio of 0.3:2.7:1 and coated and immersed in the amount of 4.0 g/$m^2$ as the amount of solid content (Sample and Comparative Sample polymer amount of 1.0 g/$m^2$) in the same manner as the Examples-1~5 followed by drying, printing and testing after printing.

The results of water resistance, light resistance and evaluating color densities as described above are shown in Table 4.

In addition, the degrees of feathering were evaluated by visual inspection using a magnifying glass.

◎: feathering is not recognized, Δ: feathering is recognized, X: feathering is significantly recognized

SYNTHESIS EXAMPLES-9~10

A 20% aqueous solution of polyvinyl alcohol (abbreviated as PVA) (trade name: PVA105 (saponification index: 98%, degree of polymerization: 500) manufactured by Kurare Co.) and N-vinylcarboxylic acid amide monomers having the compositions described in Table 5 were charged into a 500 ml four-neck flask equipped with a thermometer, stirrer, nitrogen feed tube and condenser, after which the pH was adjusted to 5.5 and the total concentration of PVA105 and monomers was adjusted to 20% by addition of deionized water.

Nitrogen replacement within the system was performed for 30 minutes while stirring the raw material mixture and maintaining the temperature at 60° C. Next, 0.5 wt % (per monomer) of polymerization initiator V-50 was added to initiate polymerization.

After maintaining at 60° C. for 4 hours, 0.2 wt % (per monomer) of polymerization initiator V-50 was added, and the reaction was allowed to continue for 8 hours from the time of initiation to obtain a uniform product.

This polymer mixture was alkaline hydrolyzed to hydrolyze 95% of the N-vinylcarboxylic acid amide unit therein to obtain vinylamino units. The mixtures of hydrolyzed polymers were designated as Samples-9 and -10.

TABLE 4

| | | Water Resistance | | | | Light Resistance | | | | Color Density | | | | |
|---|---|---|---|---|---|---|---|---|---|---|---|---|---|---|
| | | | | | | | | | | C | M | Y | B | |
| | Name of Sample | C | M | Y | B | C | M | Y | B | (−b*) | (a*) | (b*) | (L*) | Feathering |
| Example 6 | Sample-5 | A | B | A | A | A | B | A | A | 45.6 | 64.0 | 74.1 | 33.0 | ◎ |
| Example 7 | Sample-6 | A | B | A | A | A | B | A | A | 46.1 | 64.4 | 74.8 | 33.5 | ◎ |
| Example 8 | Sample-7 | A | B | A | A | A | B | A | A | 46.7 | 64.0 | 74.9 | 33.0 | ◎ |
| Example 9 | Sample-8 | A | B | A | A | A | B | A | A | 46.8 | 63.8 | 74.5 | 33.2 | ◎ |
| Comparative Example 6 | Comparative Sample-5 | B | C | A | B | A | C | A | A | 43.8 | 63.2 | 73.2 | 35.4 | X |
| Comparative Example 7 | Comparative Sample-6 | B | C | A | B | A | C | A | A | 44.1 | 63.4 | 73.1 | 35.0 | Δ |
| Comparative Example 8 | Comparative Sample-7 | B | C | A | B | A | C | A | A | 44.0 | 63.1 | 72.8 | 35.5 | X |
| Comparative Example 9 | Comparative Sample-8 | B | C | A | B | A | C | A | A | 44.2 | 64.0 | 73.5 | 33.6 | Δ |

C: cyan, M: magenta, Y: yellow, B: black

The cation equivalent values, the intrinsic viscosities, and the weight ratio (% insoluble matter) of methanol-insoluble matter of the Samples-9~10 were measured by the same procedures as the Synthesis Example-1. Polymer properties are shown in Table 5.

COMPARATIVE SYNTHESIS EXAMPLES-9~10

Polymerization of N-vinylcarboxylic acid amide monomer was performed according to the same procedure as the Synthesis Examples-9~10 without adding PVA to obtain poly-N-vinylcarboxylic acid amide, and a polymer mixture was obtained by mixing an equal amount of PVA as that used in the Synthesis Examples-9~10 with the poly-N-vinylcarboxylic acid amide. This polymer mixture was alkaline hydrolyzed to hydrolyze 95% of the N-vinylcarboxylic acid amide units therein to obtain a mixed polymer of cationic polymer having vinylamino units and PVA. These polymer mixtures were designated as Comparative Samples-9~10. The Comparative Samples-9 and -10 separated into 2 phases, and again separated into 2 phases within 1 day even after mixed with a homogenizer.

The cation equivalent value, the intrinsic viscosities, the weight ratio (% insoluble matter) of methanol-insoluble matter of the Comparative Samples-9~10 were measured by the same procedures as the Synthesis Example-1. Polymer properties are shown in Table 5.

adjusted to 5.0 and the total concentration of PVA105 and monomers was adjusted to 30% by addition of deionized water.

Nitrogen replacement within the system was performed for 30 minutes while stirring the raw material mixture and maintaining the temperature at 60° C. Next, 0.3 wt % (per monomer) of hydroxylamine hydrochloride as a crosslinking preventor, 0.5 wt % (per monomer) of 2-mercaptoethanol as a chain transfer agent, and 0.5 wt % (per monomer) of polymerization initiator V-50 were added to initiate polymerization.

After maintaining at 60° C. for 6 hours, an equivalent amount of hydrochloric acid as that of N-vinylformamide used was added, and the reaction was allowed to continue for 5 hours at 90° C. The obtained polymers were designated as Samples-11 and 12.

The cation equivalent values, the intrinsic viscosities, and the weight ratio (% insoluble matter) of methanol-insoluble matter of the Samples-11~12 were measured by the same procedure as the Synthesis Example-1. In addition, amidine proportions of the products were measured by NMR method. Polymer properties are shown in Table 6.

COMPARATIVE SYNTHESIS EXAMPLES-11~12

Polymerization of monomer compositions described in Table 6 was performed according to the same procedure as the Synthesis Examples-11~12 without adding PVA, and a polymer mixture was obtained by mixing an equal amount of PVA as that used in the Synthesis Examples-11~12 with the obtained products followed by the reaction with hydrochloric acid. These polymer mixtures were designated as Comparative Samples-11~12. Polymer properties are shown in Table 6.

TABLE 5

| Name of Sample | Formula weight ratio VA:Cationic Group | Kind of Monomer | Cationic Equivalent Value (meq/g) | Intrinsic Viscosity (g/dl) | Insoluble Matter (%) |
|---|---|---|---|---|---|
| Sample-9 | 25:75 | NVF | 10.00 | 0.38 | 29 |
| Sample-10 | 33:67 | NVA | 9.40 | 0.41 | 31 |
| Comparative Sample-9 | 25:75 | NVF | 10.00 | 0.40 | 100 |
| Comparative Sample-10 | 33:67 | NVA | 9.40 | 0.40 | 100 |

NVF: N-vinylformamide
NVA: N-vinylacetamide
VA: vinylalcohol units

SYNTHESIS EXAMPLES 11~12

A 23% aqueous solution of polyvinylalcohol (trade name: PVA105 (saponification index: 98%, degree of polymerization: 500) manufactured by Kurare Co.) and monomer compositions described in Table 6 were charged into a 500 ml four-neck flask equipped with a thermometer, stirrer, nitrogen feed tube and condenser, after which the pH was

TABLE 6

| Name of Sample | Formula weight ratio VA:Cationic Group | NVF/AN mol ratio | Polymerization pH | Cationic Equivalent Value (meq/g) | Intrinsic Viscosity (g/dl) | Insoluble Matter (%) | Polymer compositi on P/Q/R % |
|---|---|---|---|---|---|---|---|
| Sample-11 | 25:75 | 60/40 | 5.0 | 7.20 | 0.35 | 25 | 44/39/17 |
| Sample-12 | 33:67 | 60/40 | 5.0 | 6.71 | 0.42 | 34 | 49/28/23 |
| Comparative Sample-11 | 25:75 | 60/40 | 5.0 | 7.15 | 0.32 | 98 | 45/40/15 |

TABLE 6-continued

| Name of Sample | Formula weight ratio VA:Cationic Group | NVF/AN mol ratio | Polymerization pH | Cationic Equivalent Value (meq/g) | Intrinsic Viscosity (g/dl) | Insoluble Matter (%) | Polymer composition P/Q/R % |
|---|---|---|---|---|---|---|---|
| Comparative Sample-12 | 33:67 | 60/40 | 5.0 | 6.76 | 0.39 | 97 | 48/30/22 |

NVF: N-vinylformamide
AN: acrylonitrile
VA: vinylalcohol units
P: mol % of primary amino groups
Q: mol % of amidine groups
R: mol % of cyano groups

EXAMPLES 10~13, COMPARATIVE EXAMPLE 10~13

Application of Treating Agent

The same procedures as in the Examples-1~5 were repeated except for using the treating agents for a sheet surface of Samples-9~12 and Comparative Samples-9~12 to obtain coating colors. The coated papers were dried and then used in printing and later testing. Printing of Test Paper and Measurement of Water and Light Resistance Evaluation testing was performed in the same manner as the Examples-1~5, and the color densities, water resistance and light resistance of each sample were evaluated. The results of each measurement are shown in Table 7.

used was added, and the reaction was allowed to continue for 5 hours at 90° C. The reaction solution was added with a large amount of acetone and removed water contained, and powdered polyvinylamine hydrochloride was obtained.

After that, the obtained polyvinylamine hydrochloride and vinylacetate monomer composition described in Table 8 were charged into a 500 ml four-neck flask equipped with a thermometer, stirrer, nitrogen feed tube and condenser, after which the pH was adjusted to 3.5 and the total concentration of polyvinylamine hydrochloride and vinylacetate monomer was adjusted to 25% by addition of deionized water.

Nitrogen replacement within the system was performed for 30 minutes while stirring the raw material and maintaining the temperature at 60° C. Next, 0.5 wt % (per monomer) of ammoniumperoxodisulfate as a polymerization initiator was added to initiate polymerization.

TABLE 7

| | | Water Resistance | | | | Light Resistance | | | | Color Density | | | |
|---|---|---|---|---|---|---|---|---|---|---|---|---|---|
| | Name of Sample | C | M | Y | B | C | M | Y | B | C (−b*) | M (a*) | Y (b*) | B (L*) |
| Example 10 | Sample-9 | A | B | A | A | A | B | A | A | 44.4 | 63.9 | 73.3 | 33.2 |
| Example 11 | Sample-10 | A | B | A | A | A | B | A | A | 45.2 | 64.5 | 73.8 | 33.5 |
| Example 12 | Sample-11 | A | A | A | A | A | A | A | A | 43.3 | 65.0 | 72.8 | 33.7 |
| Example 13 | Sample-12 | A | A | A | A | A | A | A | A | 45.0 | 65.0 | 73.1 | 33.0 |
| Comparative Example 10 | Comparative Sample-9 | B | C | A | B | A | C | A | A | 42.3 | 63.0 | 73.2 | 35.4 |
| Comparative Example 11 | Comparative Sample-10 | B | C | A | B | A | C | A | A | 42.6 | 63.7 | 73.0 | 35.0 |
| Comparative Example 12 | Comparative Sample-11 | B | C | A | B | A | C | A | A | 42.1 | 63.3 | 73.0 | 35.3 |
| Comparative Example 13 | Comparative Sample-12 | B | C | A | B | A | C | A | A | 42.0 | 63.6 | 73.1 | 35.2 |

C: cyan, M: magenta, Y: yellow, B: black

SYNTHESIS EXAMPLES 13~14

A 20% aqueous solution of N-vinylformamide was charged into a 500 ml four-neck flask equipped with a thermometer, stirrer, nitrogen feed tube and condenser, after which the pH was adjusted to 5.5.

Nitrogen replacement within the system was performed for 30 minutes while stirring the raw material and maintaining the temperature at 60° C. Next, 0.3 wt % (per monomer) of hydroxylamine hydrochloride as a crosslinking preventor, 0.5 wt % (per monomer) of 2-mercaptoethanol as a chain transfer agent, and 0.5 wt % (per monomer) of V-50 as a polymerization initiator were added to initiate polymerization.

After maintaining at 60° C. for 6 hours, an equivalent amount of hydrochloric acid as that of N-vinylformamide After maintaining at 60° C. for 4 hours, 0.2 wt % (per monomer) of polymerization initiator V-50 was added, and the reaction was allowed to continue for 8 hours.

The obtained polymer was alkaline hydrolyzed followed by neutralization with hydrochloric acid to obtain a graft copolymer comprising a back bone polymer having 95 mol % of vinylamino units (in the form of hydrochloride) and branch polymers comprising polyvinyl alcohol (95mol % hydrolysis product of polyvinylacetate). The hydrolysis products of the polymer mixture were designated as Samples-13 and 14.

The cation equivalent values, the intrinsic viscosities, and the weight ratio (% insoluble matter) of methanol-insoluble matter of the Samples-13~14 were measured by the same procedure as the Synthesis Example-1. Polymer properties are shown in Table 8.

TABLE 8

| Name of Sample | Formula weight ratio VA:Cationic Group | Cationic Equivalent Value (meq/g) | Intrinsic Viscosity (g/dl) | Insoluble Matter (%) |
|---|---|---|---|---|
| Sample-13 | 25:75 | 9.88 | 0.35 | 36 |
| Sample-14 | 33:67 | 9.25 | 0.44 | 33 |

VA: vinylalcohol units

EXAMPLES 14~15

Application of Treating Agent

The same procedures as in the Examples-1~5were repeated except for using treating agents for a sheet surface of Samples-13~14 to obtain coating colors. The coated papers were dried and then used in printing and later testing.

Printing of Test Paper and Measurement of Water and Light Resistance

Evaluation testing was performed in the same manner as the Examples-1~5, and the color densities, water resistance and light resistance of each sample were evaluated. The results of each measurement are shown in Table 9.

TABLE 9

| | | Water Resistance | | | | Light Resistance | | | | Color Density | | | |
|---|---|---|---|---|---|---|---|---|---|---|---|---|---|
| | | | | | | | | | | C | M | Y | B |
| | Name of Sample | C | M | Y | B | C | M | Y | B | (−b*) | (a*) | (b*) | (L*) |
| Example 14 | Sample-13 | A | B | A | A | A | B | A | A | 45.4 | 64.7 | 73.5 | 33.1 |
| Example 15 | Sample-14 | A | B | A | A | A | B | A | A | 45.3 | 64.5 | 73.8 | 33.6 |

C: cyan, M: magenta, Y: yellow, B: black

Industrial Applicability

The treating agent for a sheet surface of the present invention is composed of a copolymer obtained by polymerizing di(meth)allylamine-based monomers and/or (meth)acryl-based cationic monomers and so forth in the presence of, for example, a water-soluble or water-dispersible polymer containing vinyl alcohol units by radical polymerization, etc. According to the present invention, feathering, a particular problem of common-use paper, is prevented, water resistance and light resistance are improved without decreasing color density during printing, and there is strong bonding with the ink dye, thereby allowing the present invention to be preferably used as a treating agent for an ink jet printing paper. The present invention has a significant applicability in the industrial field.

What is claimed is:

1. A treating agent for a sheet surface, comprising a copolymer comprising a polymer moiety having vinyl alcohol units and a polymer moiety having cationic group, said copolymer being a graft copolymer in which said respective polymer moieties are a back bone polymer and a branch polymer, either of which has the vinyl alcohol units, and the other of which has the cationic groups, wherein said back bone polymer of said graft copolymer is derived from a water-dispersible polymer having vinyl alcohol units, and said branch polymer is composed of at least one repeating unit selected from the group consisting of a repeating unit represented by the following formula (1):

(1)

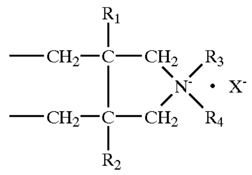

wherein, $R_1$ and $R_2$ represent H or $CH_3$, $R_3$ and $R_4$ represent hydrogen, alkyl groups having 1~4 carbon atoms or benzyl groups, and $X^-$ represents a counter ion.

2. A treating agent for a sheet Surface according to claim 1, wherein said graft copolymer is obtained by radical polymerization of a monomer composition generating at least one repeating unit selected from the group consisting of the repeating unit represented by said formula (1) in the presence of the water-dispersible polymer having vinyl alcohol units.

3. A treating agent for a sheet surface according to claim 2, wherein, in said radical polymerization reaction, the pH of the reaction system is from 1.0 to 6.0.

4. A treating agent for a sheet surface according to claim 1, wherein the formula weight ratio of the vinyl alcohol units of said water-dispersible polymer having vinyl alcohol units and the cationic groups is from 1:20 to 2:1.

5. A treating agent for a sheet surface according to claim 1, wherein the proportion of the vinyl alcohol units contained in said water-dispersible polymer having vinyl alcohol units is from 70 mol % to 100 mol %.

6. A treating agent for a sheet surface according to claim 1, wherein the degree of polymerization of said water-dispersible polymer having vinyl alcohol units is from 100 to 2500.

7. A treating agent for a sheet surface according to claim 1, wherein said water-dispersible polymer having vinyl alcohol units is grafted to 40% or more weight percent of the repeating unit of the back bone polymer by radical polymerization.

8. A treating agent for a sheet surface according to claim 1, wherein methanol is added in an amount 10 times a weight of a polymer aqueous solution, in which the concentration of the polymer mixture after said grafting reaction is 20 wt %, to form precipitate of the polymer having vinyl alcohol units, and the amount of dry matter formed as precipitate is 60 wt % or less of a weight of the water-dispersible polymer having vinyl alcohol units used as raw material.

9. A treating agent for a sheet surface according to claim 1, wherein the intrinsic viscosity of said polymer mixture after grafting reaction in 2% ammonium sulfate aqueous solution at 25° C. is from 0.1 to 2.0 dl/g.

10. A paper for ink jet printing prepared by coating a coating color comprising the treating agent for a sheet surface according to claim 1, a filler, and a binder onto a sheet surface.

11. A paper for ink jet printing prepared by making a treating solution comprising the treating agent for a sheet surface according to claim 1 penetrate into a sheet surface.

12. A paper for ink jet printing according to claim 10, wherein said paper comprises the treating agent for a sheet surface of 0.02 to 5 $g/m^2$.

* * * * *